(12) United States Patent
Poehlau

(10) Patent No.: US 6,772,655 B2
(45) Date of Patent: Aug. 10, 2004

(54) HARMONIC DRIVE

(75) Inventor: Frank Poehlau, Fuerth (DE)

(73) Assignee: Oechsler AG, Ansbach (DE)

( * ) Notice: Subject to any disclaimer, the term of this patent is extended or adjusted under 35 U.S.C. 154(b) by 0 days.

(21) Appl. No.: 10/296,729

(22) PCT Filed: Apr. 28, 2001

(86) PCT No.: PCT/EP01/04827
§ 371 (c)(1),
(2), (4) Date: Nov. 25, 2002

(87) PCT Pub. No.: WO01/90603
PCT Pub. Date: Nov. 29, 2001

(65) Prior Publication Data
US 2003/0121363 A1 Jul. 3, 2003

(30) Foreign Application Priority Data

May 25, 2000 (DE) .......................................... 100 26 038

(51) Int. Cl.$^7$ ............................................. F16H 49/00
(52) U.S. Cl. ....................................... 74/640; 74/89.23
(58) Field of Search .............................. 74/640, 89.15, 74/89.23; 310/83

(56) References Cited

U.S. PATENT DOCUMENTS 3,668,946 A  *  6/1972  Fahey et al. ................... 74/640
4,678,952 A  *  7/1987  Peterson et al. ............... 310/83
5,634,373 A  *  6/1997  Cuffe et al. ................. 74/89.42
6,477,918 B2 * 11/2002  Sakamoto ..................... 74/640

FOREIGN PATENT DOCUMENTS

JP          06241285 A   *   8/1994  ............. F16H/1/32

* cited by examiner

Primary Examiner—Richard M. Lorence
(74) Attorney, Agent, or Firm—Horst M. Kasper

(57) ABSTRACT

In order to guide supply or construction elements through a harmonic drive (8) in a central manner, said harmonic drive is embodied in a hollow gear. The harmonic drive directly provides a given correcting translatory variable which is defined by the speed of rotation of the output ring and motor driven harmonic generator when the output ring axially displaces a threaded rod (26) which freely extends in a coaxial manner through a longitudinal bore in the harmonic drive and engages with said output ring, said axial displacement occurring as a result of the rotational movement of the inner thread of the output ring, whereby the threaded rod is secured to the housing and prevented from rotating (29, 30). The threaded rod can move in a linear manner in relation to the gear motor (13) when the gear motor is installed in a stationary manner or when the treaded rod is installed in a stationary manner.

13 Claims, 3 Drawing Sheets

Figure 1:
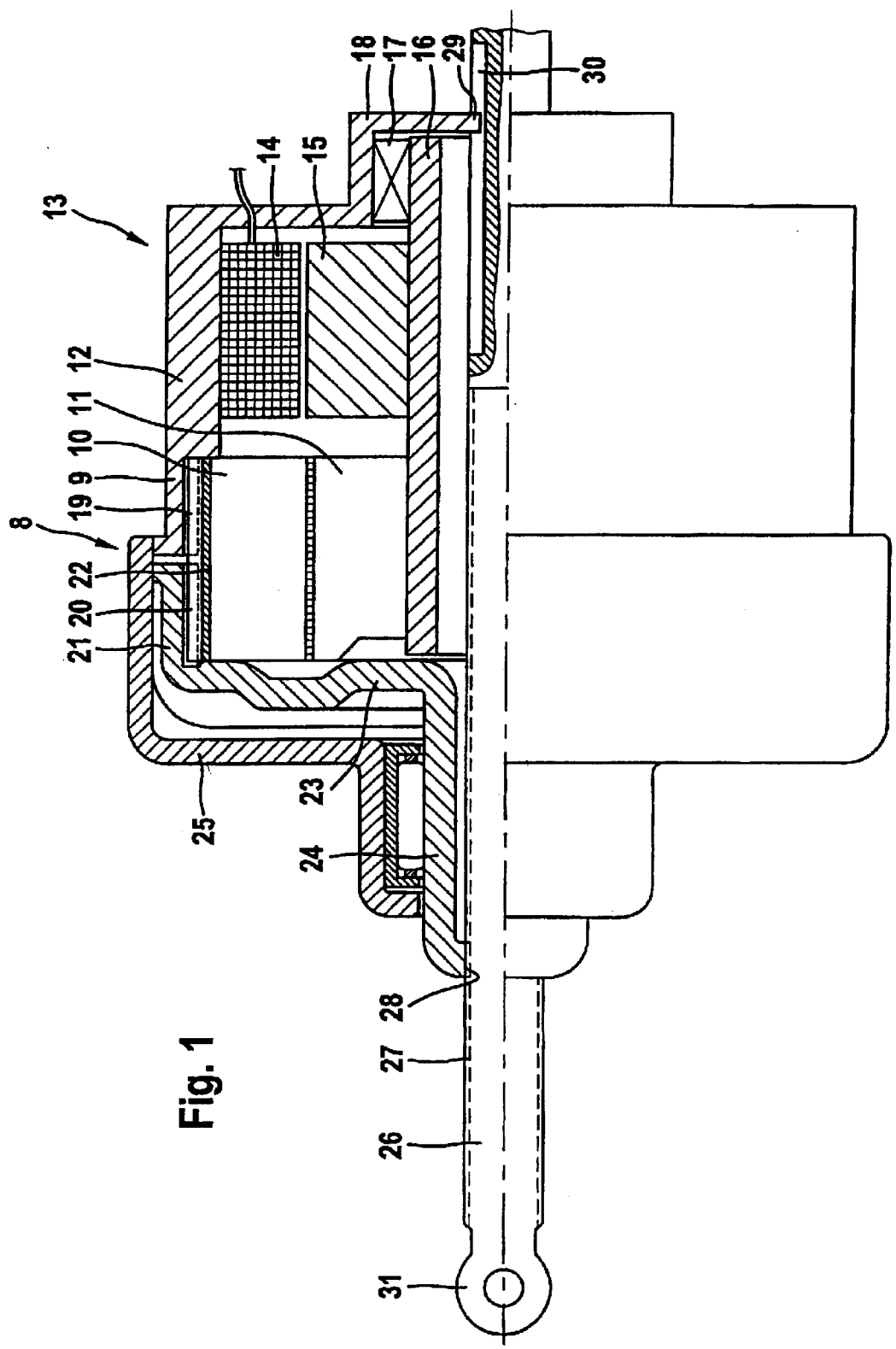

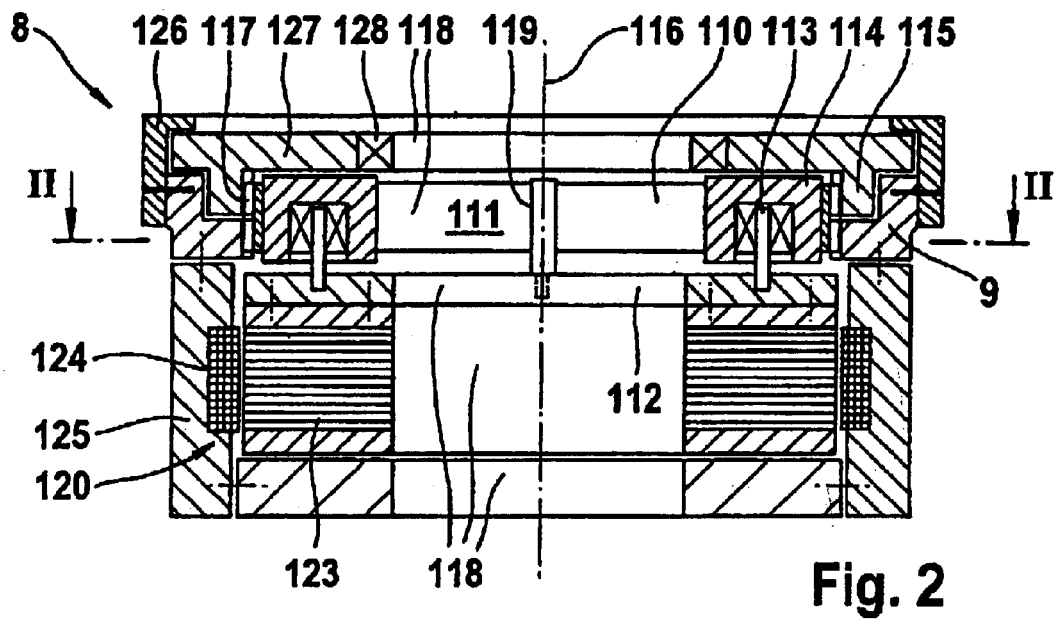
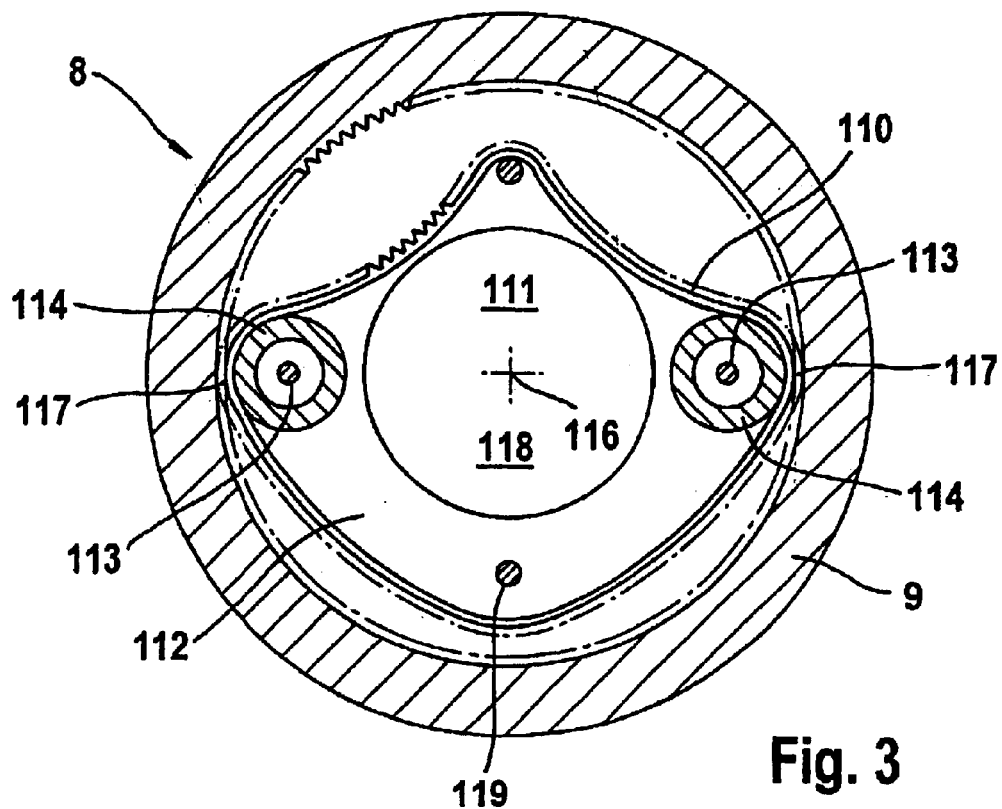

HARMONIC DRIVE

The present Invention relates to a harmonic drive according to the preamble of the main claim.

It is known from the type forming pre-publication U.S. Pat. No. 5,370,011 that on the one side of the harmonic drive there is a drive motor and on the other side there is disposed the drive for the ball thread spindle disposed axially opposite to the drive motor, wherein the ball thread spindle extends from here coaxially from the harmonic drive. A thin bore hole runs coaxially through the drive motor and the harmonic drive up to the interior of the spindle, wherein the cross-section of the thin bore hole is filled essentially with the rod axially adjustable and stationery supported at the motor casing, wherein the rod carries a sensor by way of which the momentary axial position of the spindle can be determined relative to the motor casing. Thus the spindle is disposed beyond the drive motor, the spindle does not run through the drive motor itself; and also no other function element or construction element can extend centrally through the drive motor because of the presence of the sensor rod.

The function of this wave gear, known also as harmonic drive or ring belt transmission as a very heavily reducing, self locking system with the power take off rotating coaxially to the drive shaft, rests on the fact that a rotating so-called wave generator radially deforms circulatingly an inside wheel tire and thereby presses on circulatingly and locally the outer jacket face of the inside wheel tire toward the outside against the hollow cylindrical inner jacket face of slightly larger circumference of a stationary, dimensionally stable support ring. Consequently the inside wheel itself or the wheel tire rotatably supported on the inside wheel rolls in the support ring force matchingly over friction faces or shape matchingly over gear splines, where in the wheel or, respectively the tire of the wheel rotates slow or as compared with the motor driven drive core of the wave generator depending on the measure of the difference in circumference. This rotary motion strongly decelerated relative to the drive is preferably transferred through the outer jacket face or, respectively the outer splines of the wheel tire onto the inner jacket face or, respectively, onto the inner splines of a further hollow cylindrical outer ring, of the power take offering disposed concentrically to the support ring, however not stationary disposed but rotatable relative to the hollow cylindrical outer ring. According to the kind forming contribution "Genial einfach" of H. Kirn (KEM Antriebstechnik Heft 11, 1996) a cam shaped non-round (oval in axial cross section) drive core is rotated as a wave generator concentrically in the hub of the radially deformable inside wheel. Dimensionally stable spokes operate as radially oriented tappets between the hub circulatingly radially deformed by the drive core and the outer toothed tire of this inside wheel also radially deformable and in fact that the outer splines corresponding to their circulating radial deformation stands in engagement with the inner splines of the support ring in each case only over the limited arcuate piece just rolling off. This harmonic drive is based on its strong reduction and self locking particularly suitable for sensitive and good reproduceable, mechanically stable and manually performable adjustment tasks and setting tasks. A motor drive of such a wave generator usually is performed through a high-speed and therefore cost favorably available low voltage D.C. motor connected coaxially to the drive core, wherein the rotation of the low voltage D.C. motor thus is reduced to a very much slower of a correspondingly larger torque at the power take off shaft. Such motor gear combination is employed in particular in electromechanical, rotary operating adjustment devices in a motor vehicle. If the application requires that the output motion is linear then usually such a motor drive combination is connected to a further transmission for transferring the output rotary motion into a translation motion, wherein frequently the axis of the harmonic drive has to be disposed orthogonal and perpendicular to the axis of the linear drive based on kinematic reasons. For this purpose in particular the kind of construction is known in the drive technology and in the transmission technology, which kind of construction carries a nut on an external extension of the motor shaft furnished with an outer thread, wherein the nut is shifted in longitudinal direction based on the shaft rotation, since the nut is mechanically arrested against a co-rotation. An eccentrically supported swivel lever on this nut is engaged usually with a swivel lever orthogonal and perpendicular disposed to the shaft, wherein the swivel lever transfers the linear motion of the sliding nut as a swivel motion onto the place of operation, which is additionally disadvantageous relative to the overall degree of effectiveness as well as to the space requirements.

The invention is based on the technical problem to further develop the harmonic drive by maintaining the apparatus oriented and application oriented advantages in the direction that further application possibilities, which could not yet be realized up to now based on the construction, in particular also in connection with an equipping as a gear motor, are opened up and are preferably placed constructively into the harmonic drive itself.

The solution of this task characterized in the main claim is designated as a hollow shaft drive based on the large inner diameter in comparison with the ratio to the diameter of the apparatus of a channel extending through the harmonic drive concentrically. This is associated with the advantage to be able to place for example supply lines or construction elements through the center of the transmission. The consideration that the non-round drive core of the harmonic drive, which non-round drive core leads to the described rolling off of the flexible sleeve collar (flex splines) in the support ring, as well as the motor shaft rotating the support ring in a motor drive combination, even then can be realized with sufficient stiffness against torsion, if a tubular construction is performed, which construction determines the passage channel, was a starting point for this solution.

Now electrical or hydraulic supply lines can run concentrically through the harmonic drive, which allows for a preassembled and space saving gear incorporation. Also the harmonic drive can be carried on a stationary passing through pipe conduit spatially fixed in the kind of a sleeve in order to for example set a fluid throttle of the kind of an iris diaphragm in this pipe conduit by immediate attack of the swivelable gear power take off ring at a diaphragm lever projecting radially from the pipe conduit; or a movably supported pin for switching tasks and signal tasks movably supported is running coaxially through the spatially fixed mounted harmonic drive or possibly even in the drive itself, wherein the movably supported pin is adjusted by the power take off ring by rotation or (through a thread engagement) through axial shifting.

An axial power take off with a spindle shaped threaded rod is present in the latter case, wherein the threaded rod is received axially shiftable in the channel of the hollow transmission. This threaded rod mechanically secured against rotation protrudes from the harmonic drive more or less, namely according to the measure of rotation of the power take off ring, wherein the threaded rod is shape matching in engagement with the bearing tappet in the shape of a shaft end inner thread.

This further development of the solution according to the present invention is associated with the advantage to obtain immediately at the output of the harmonic drive a linear output motion without particular apparative additional equipment and therefore both space saving as well as low loss, that is the linear motion of a (threaded) rod relative to the casing of the transmission. The transfer of the motion from the rotation into translation is immediately placed into a wave generator and is thus at the same time integratable into a transmission motor without a requirement of having to substantially increase the radial dimensions of the harmonic drive for this purpose. For example processing tools or work tables can be precisely positioned or sliders or the like can be directly linearly set without an intermediate positioning of worm gears. The transmission motor can here be installed spatially fixed and the rod can move outward and inward; or the rod is for example installed spatially fixed horizontally or vertically and the motor transmission unit rides along this gear rack. The hollow transmission equipped in this manner delivers thus immediately a pre-given translational set value defined through the rotation speed of the power take off ring and therewith of the motor driven wave generator, if the power take off ring of the hollow transmission axially shifts a threaded rod extending otherwise freely and coaxially through a central longitudinal bore hole in the harmonic drive and engaged with the power take off ring, through the rotary motion of the inner thread of the power take off ring, since the threaded rod is secured fixed to the casing against rotation.

An axially short ring disk concentrically rotating around the channel axis can particularly advantageously serve as carrier of at least two eccentric, axially parallel oriented pins as a wave generator instead of a thick walled tubular non-round drive core, wherein an axially wide radially flexible sleeve collar of the kind of a broad toothed belt runs over the pins (and thus axially shifted relative to the ring disk), wherein the flexible sleeve collar circulated with the pin is locally pressed into support rings and power take off rings surrounding the ring disk with its pins and disposed coaxially next to each other in the inner periphery.

An electro-motor drive for this hollow harmonic drive can be disposed externally and can be for example connected to the transmission on the input side through a gear wheel or a worm drive. In the case of a drive side belt drive, the support ring for the circulating pin can serve at the same time as a pulley or, respectively, as a toothed belt—crown gear. However a harmonic drive motor can be more space saving and simpler pre-assembled if the drive of the motor is according to the present invention integrated into the transmission by having the rotor of the motor, which then is furnished on the front side with the support ring for the circulating press on pins, exhibits the shape of a thick-walled hollow cylinder in a ring shaped stator casing.

Figure 4:
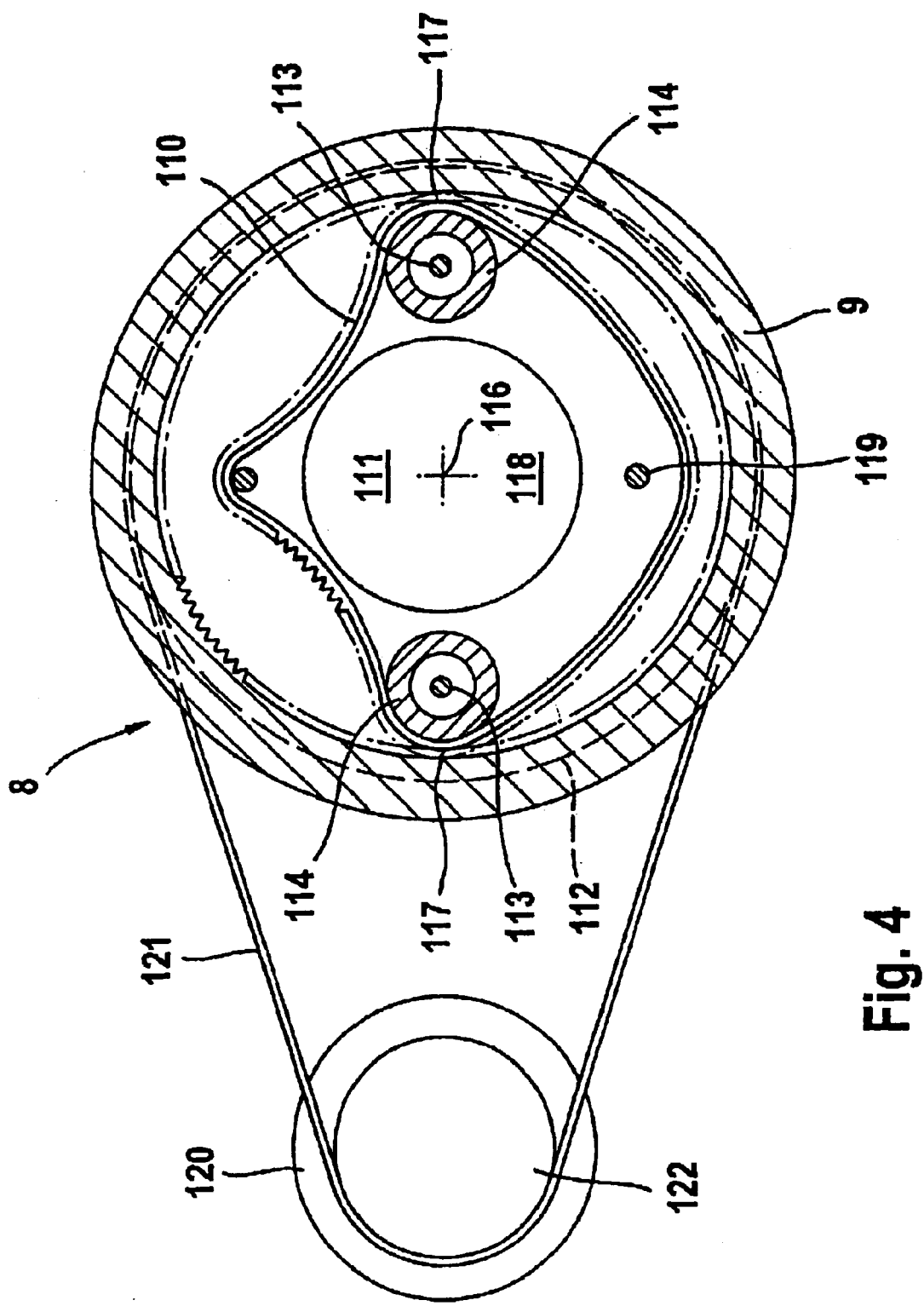

With respect to additional further developments and their features and advantages, reference is made in addition to the further claims and also to the following description of an embodiment example sketched in the drawing by limitation to the functionally important and not completely made to scale for hollow harmonic drives according to the invention and their drive motors. There is shown in the drawing:

FIG. 1 partially in an axially longitudinal section—a longitudinally shiftable threaded rod in the direction of the rotation axis through the wave generator drive core of a hollow transmission motor as a translationally adjustable output spindle, FIG. 2 in an axial longitudinal section—a transmission motor with an electronic drive integrated into the hollow harmonic drive with a modified construction of the wave generator and of the, drive relative to FIG. 1, FIG. 3 a cross-section through the support ring of the harmonic drive according to FIG. 2, through the wave generator of the harmonic drive in the shape of a ring disk furnished with circulating rollers in a front elevational view, and FIG. 4 harmonic drive with ring disk equipped with according to FIG. 3, wherein the ring disk however now is driven by a belt drive from an externally stationed motor.

As illustrated in more detail in the initially recited publications, a radially circulating deformable inside wheel 10, directly or a tire shaped sleeve collar 22 supported not necessarily fixed against rotation by the inside wheel 10, of slightly lesser circumference relative to the support ring 9 is penetrated coaxially by the rotating drive core 11 having a nonround cross-section of the so-called wave generator at a harmonic drive 8 in a dimensionally stable hollow cylindrical support ring 9 fixed relative to the casing. The inside wheel 10 receives from the wave generator its circulating radial deformation for the retarded rolling off of the flexible sleeve collar (flex splines) 22 of the inside wheel 10 in the support ring 9.

The drive of the harmonic drive is performed by way of a reversible low voltage motor 13 with in this case electromagnetic stator 14 integrated into the transmission casing 12 according to a preferred example embodiment. The permanent magnet rotor 15 rotating concentrically in the electromagnetic stator 14 rests fixed against rotation on a tubular shaped hollow motor shaft 16, wherein the neighboring front end of the hollow motor shaft 16 is at least radially supported in the front side end plate 18 of the casing 12 through a roller bearing 17. The motor shaft 16 extends into the wave generator on the opposite side neighboring to the proper motor 13, wherein the drive core 11 of the wave generator rests also fixed against rotation on the hollow motor shaft 16.

The driving coupling between the internal gearing 19 of the support ring 9 and the inner gearing 20 of the power take off ring 21 is performed through the flexible sleeve collar (flex splines) 22 as the locally circulating outer gearing of the inside wheel 10, wherein the outer gearing can bulge outward in a radial direction. The power take off ring 21 is part of an axial flat pot shaped or bell shaped rotary plate 23, wherein the power take off ring 21 in turn is rollingly supported with its shaft end 24 in a casing hood 25.

A spindle shaped threaded rod 26 extends linear shiftable in the embodiment according to FIG. 1 and concentrically through the coaxial channel of the hollow drive also through the power take off side hollow shaft end 24, through the central bore hole in the motor shaft 16 with its drive core 11 and through the drive side end plate 18. The outer thread 26 of the threaded rod 26 stands in engagement on the output side with an inner thread 28 in the shaft end 24 of the power take off side rotating plate 23, wherein the rotating plate 23 is actually fixed rotatable relative to the casing 12, the threaded rod 26 is secured against rotation in the drive side region of the casing 12 in the region of the other, axially opposite the disposed end of the threaded rod 26, possibly by a radial engagement of a nose 29 formed or attached at the end plate 18 into an axially parallel longitudinal groove 30 in the outer jacket face of the threaded rod 26.

The slow rotation of the power take off side hollow shaft end 24 caused by the quickly rotating motor shaft 16 through the flex splines 22 thus effects an axial shifting of the threaded rod 26 through the inner thread 28 of the shaft end 24, wherein the half lengths of the threaded rod 26 is pre-settable with the given threaded slope 27/28 over the number of rotations of the power take off ring and their maximum slope through the length of the securing groove 30 in the threaded rod 26. Thus a precise immediate linear positioning of a here connected signal element or set element relative to the spatially fixed installed harmonic drive 8 with its drive motor 13 is achieved through the momentary distance of a connection member 31 disposed outside of the casing 12–25 of the drive motor 8–13 at the threaded rod 26 from the stationary casing 12–25. On the other hand, also the rod 26 can be spatially fixed disposed, in order to linearly move the drive motor 8–13 based on the measure of rotations of the power take off side shaft end 24 along the threaded rod 26.

In order to be able to hold open the otherwise with the harmonic drive 8 constructively occupied center for other construction requirements or assembly requirements, the radial flexible toothed belt shaped sleeve collar 110 experiences according to the embodiment example of FIG. 2 the circulating radial deformation from a rotating ring disk 112 for the retarded rolling off of the engagement region 117 of the sleeve collar 110 in the casing fixed, that is stationary support ring 9 relative to the rotation of the wave generator 111. That central large face punched disk 112 carries for this purpose several axially parallel pins 113, and preferably two disposed diametrically opposite to each other axially parallel pins 113, wherein the flexible sleeve collar (flex spline) 110 runs around the axially parallel pins 113 concentrically to the ring disk 112 and axially neighboring to the disk 112. The pins 113 can be axial shafts for rolling supported rollers 114 for decreasing of frictional losses, wherein the rollers 114 are put cup shaped over the free front ends of the bearing pins 113 coordinated to the rollers 114 in the illustrated constructively preferred example situation. These two rollers 114 disposed diametrically opposite to each other and carried by the ring disk 1 12 press the toothed outer jacket face of the flexible sleeve collar (flex spline) 110 in the engagement region 117 radially into the also toothed, axial next to each other disposed, dimensionally stable hollow cylindrical inner jacket face of the stationary support ring 9 and the rotating power take off ring 115 neighboring to the-stationary support ring 9.

By swiveling the rollers 1 14 with the driven ring disk 112 acting as a wave generator 111 around the transmission axis 116, the rollers 114 are thus rolling along the circulating arc shaped engagement region 115 along the flexible sleeve collar (flex spline) 110 in the rings 9/115. The circumferential difference or tooth difference between the rings 9/115 on the one hand and the flexible sleeve collar (flex spline) 110 on the other hand is in fact very small in contrast to the principal sketch shown in FIG. 3 and in FIG. 4 to be understood so far only symbolically. This difference as is known determines the correspondingly very large reduction ratio of the harmonic drive 8. The circumference of the flexible sleeve collar (flex spline) 110 or, respectively, its circularly spanned diameter is therefore hardly any smaller as the inner circumference of each of the two rings 9 and 115.

The flexible sleeve collar (flex spline) 110 can be built onto a dimensionally stable, rigid in circumferential direction but radially elastically deformable carrier about in the shape of a wide ring part of steel sheet metal or plastic, wherein the toothing for the shape matching rolling off engagement region 117 depending on material pairing is perhaps welded on, adhesively attached, injection molded, or vulcanized onto the outer jacket face of the carrier. In case of a very bending-soft flexible sleeve collar (flex spline) 110 as is perhaps the case of an axially wide and radially thin toothed belt there exists the possibility that the sleeve collar 110 apart from its actual circulating engagement region 117 determined by the rollers 114 hangs through in the channel cross-section in the center of the harmonic drive 8 caused by gravity and thus interferes here with the free passage through the coaxial channel 118. The ring disk 112 is peripherally staggered disposed relative to the bearing pin 113 as a remedy there against, is equipped with axially parallel disposed support cogs 119, wherein the support cogs 119 catch the flexible sleeve collar (flex spline) 110 radially outside of the forced engagement regions 117. Supported support rollers are also possible here, however not required based on the lack of frictional losses, since the sleeve collar 110 rests here at best unloaded, as can be recognized: on top in FIG. 3.

The motor drive 120 is mounted outside of the drive 8 and axially parallel to the drive 8 in the example situation of FIG. 4. The rotary transfer is performed by way of a transmission belt 121 from a driving pulley 122 through slots in the casing (stator 125) disposed parallel to the axis onto the outer periphery of the ring disk 112 furnished with the rolling contact rollers 114 of the hollow drive 8, wherein a friction matching or force matching transmission with smooth belts or with toothed belts and along the front edge of correspondingly profiled pulleys and ring disks 122,112 can be provided depending on the load situation. Also an external drive perhaps of a front toothed ring disk 112 through worm gears or gear wheel drives can be advantageously here realized within the frame of the present invention.

Advantageously however is an immediate furnishing of the harmonic drive 8 with an electro-motor drive 120 as is shown in FIG. 1 and in modified construction form in FIG. 2 as compared to an external drive with respect to the handling requirements and the space expenditure upon employment of the hollow drive motor. Here the ring disk 112 is axially opposite to the pins 113 and equipped coaxial with an electro-motoric multiple pole radially magnetized rotor 123 in the shape of a such constructed thick wall hollow cylinder, that the jacket face of its bore hole is at least essentially aligned with the jacket face of the bore hole in the ring disk 12 to the central channel 118 through the drive motor. The magnetization of the rotor 123 can be permanent magnetic or can be electromagnetic. The rotor 123 is surrounded by the also hollow cylindrical exciter coil 124 on the inner jacket face of the hollow cylindrical stator 125 fixed to the casing. The hollow cylindrical stator 125 also surrounds the rotary rigidly to the rotor 123 connected ring disk 112 and is then equipped on its free front face with the stationary support ring 9, wherein the flexible sleeve collar (flex spline) 110 is rolled in contact with the stationary support ring 9 by way of the therein circulating rollers 114.

A mutual peripheral engagement with the support ring 9 is furnished in FIG. 2 for the radial guiding of the power take off ring 115 disposed axially neighboring to the support ring 9, and additionally an axial collar pinned fixed against rotation with this ring 9 fixed to the casing is furnished as a support 126 in the kind of a union nut. The power take off ring 115 can be offset in the kind of an inside circulating flange to a radially, centeredly perforated front disk 127 as sketched, which front disk 127 is disposed axially in front of the rollers 114 and which front disk 127 thereby limits the axial moveability of the rollers 114.

The inner edge 128 of the front disk 127 reaching to the periphery of the central channel 118 advantageously is equipped with a roller bearing, wherein the front disk 127 and therewith the power take off ring 115 are to be supported radially turnable on a construction element such as a pipe or shaft passing through along the channel 118. If this construction element is to be rotated with the power take off ring 115, then in the inner edge 128 exhibits radial claws for engagement in correspondingly profiled notches at the rotatable construction element. If however in contrast an axially shiftable spindle rod arrested against rotation according to FIG. 1 is of concern, which spindle rod extends coaxially through the hollow drive 8, then an inner edge 128 of the power take off front disk 127 furnished with thread sections engages into the profile on the spindle rod in order to axially shift the spindle rod as described above in connection with the embodiment example according to FIG. 1.

In order to be able to lead supply elements or construction elements centrally through a channel 118 in the harmonic drive 8 according to the present invention, the wave generator 111 of the harmonic drive 8 can exhibit a hollow drive core 11 or circulatingly driven ring disk 112 with pins 113 disposed parallel to the axis, which pins 113 circulatingly radially press on a flexible sleeve collar 22,110 led away above the pins 113 along arcuate shaped limited engagement regions 117 into the inner jacket face of axially each other neighboring support rings and power take off rings 9/21,115. This ring disk 112 can be furnished as a pulley or as a gear disk to an externally disposed electromotoric drive 120. Advantageous however is the integration between a hollow drive 13,120 and the hollow harmonic drive 8, wherein the drive core 11 or, respectively, the ring disk 112 or the like wave generator 111 is equipped axially with a coaxial hollow cylindrical rotor 15,123, wherein the hollow cylindrical rotor 15,123 is surrounded by an also hollow cylindrical electromagnetic stator 15,125, serving also as carrier of the support ring 9.

What is claimed is:

1. Harmonic drive (8) with a wave generator (111) rotating around the axis (116) of the harmonic drive (8) for a coaxial rolling off of an engagement region (117) of a flexible sleeve collar (22,110) in a support ring (9) and in a power take off ring (21,115) axially disposed neighboring to the support ring (9), wherein the support ring (9) is fixedly attached at a casing (12) and wherein a coaxial channel (118) extends through the wave generator (111) characterized in that a ring disk (112) with a large inner diameter of a central bore hole of the ring disk (112) relative to the outer diameter is furnished as a wave generator (11 ), wherein the ring disk (112) is equipped on at least one of its two surfaces with axially parallel disposed pins (113) determining the engagement regions (117), wherein the flexible sleeve collar (110) runs over the pins (113).

2. Harmonic drive according to claim 1 characterized in that the ring disk (112) is equipped additionally with cogs (119) disposed parallel to the pins (113) for compensation of a flexible sleeve collar (110) hanging through to the bore hole ring disk (112) based on gravity.

3. Harmonic drive according to claim 1 characterized in that the power take off ring (115) is offset relative to a front disk (127) disposed axially in front of the pins (113) and the flexible sleeve collar (110) and wherein the front disk (127) radially grips over the pins (113) and the flexible sleeve collar (110).

4. Harmonic drive according to claim 1 characterized in that the ring disk (112) is equipped concentrically fixed against rotation with a hollow cylindrical rotor (15,123) of an electric drive (13,120) or with a transmission pulley or is constructed as a toothed disk.

5. A harmonic drive (8) comprising
    an axis (116) of the harmonic drive;
    a flexible sleeve collar (22,110);
    a support ring (9);
    a power take off ring (21,115);
    a wave generator (111) rotating around the axis (116) of the harmonic drive (8) for a coaxial rolling off of an engagement region (117) of the flexible sleeve collar (22,110) inside of the support ring (9) and inside of the power take off ring (21,115), wherein the power take off ring (21,115) is axially disposed neighboring to the support ring (9);
    a casing (12) having the support ring (9) fixedly attached;
    a coaxial channel (118) extends through the wave generator (111);
    a ring disk (112) having two surfaces and having a central bore hole with a large inner diameter relative to the outer diameter of the ring disk (112), wherein the ring disk (112) is furnished as a wave generator (111);
    axially parallel disposed pins (113) furnished on at least one of the two surfaces, wherein the engagement region (117) is determined by one of the axially parallel disposed pins (113), and wherein the flexible sleeve collar (110) runs over the pins (113).

6. The harmonic drive according to claim 5 further comprising
    cogs (119) additionally furnished to the ring disk (112), wherein the cogs (119) are disposed parallel to the pins (113) for compensating of the flexible sleeve collar (110) hanging through to the bore hole of the ring disk (112) based on gravity.

7. The harmonic drive according to claim 1 further comprising
    a front disk (127) disposed axially in front of the pins (113) and the flexible sleeve collar (110), wherein the power take off ring (115) is offset relative to a front disk (127) and wherein the front disk (127) radially grips over the pins (113) and the flexible sleeve collar (110).

8. The harmonic drive according to claim 5 further comprising
    a hollow cylindrical rotor (15,123) of an electric drive (13,120), wherein the ring disk (112) is equipped concentrically fixed against rotation with the hollow cylindrical rotor (15,123).

9. The harmonic drive according to claim 5 further comprising
    a transmission pulley, wherein the ring disk (112) is equipped concentrically fixed against rotation with the transmission pulley.

10. The harmonic drive according to claim 5 wherein the ring disk (112) is constructed as a toothed disk.

11. The harmonic drive according to claim 5 wherein the power take off ring (115) is disposed neighboring in axial direction to the support ring (9) on a side relative remote to the ring disk (12).

12. The harmonic drive according to claim 5 wherein the power take off ring (115) engages the engagement region (117) of the flexible sleeve collar (110) under the influence of the wave generator (111).

13. The harmonic drive according to claim 5 wherein a width of the flexible sleeve collar (22,110) extends over the width of the support ring (9) and over the power take off ring (115), wherein the support ring (9) and over the power take off ring (115) are disposed neighboring in co-axial direction.

* * * * *